Figure 1:
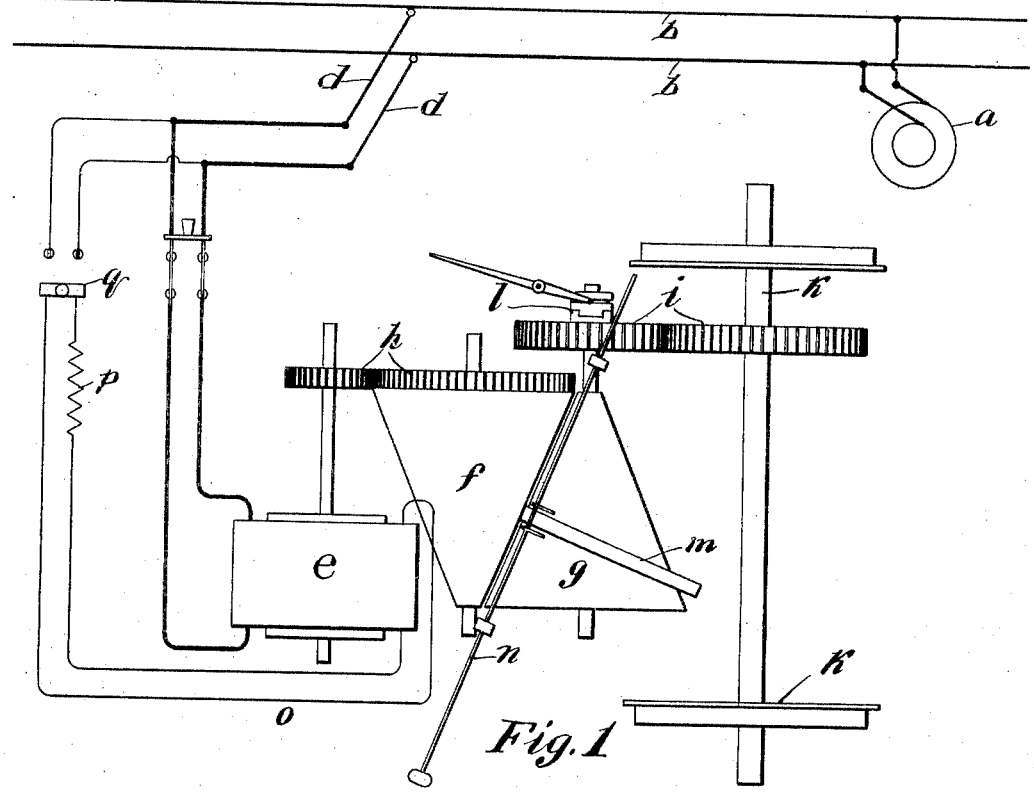

No. 759,242. PATENTED MAY 10, 1904.
G. L. CRAGG.
ELECTRIC RAILWAY SYSTEM.
APPLICATION FILED MAY 22, 1902.
NO MODEL.

Witnesses:
Lynn A. Williams
Harvey L. Hanson.

Inventor:
George L. Cragg.
By Charles A. Brown & Cragg
Attorneys.

No. 759,242. Patented May 10, 1904.

UNITED STATES PATENT OFFICE.

GEORGE L. CRAGG, OF CHICAGO, ILLINOIS, ASSIGNOR TO BION J. ARNOLD, OF CHICAGO, ILLINOIS.

ELECTRIC-RAILWAY SYSTEM.

SPECIFICATION forming part of Letters Patent No. 759,242, dated May 10, 1904.

Application filed May 22, 1902. Serial No. 108,543. (No model.)

*To all whom it may concern:*

Be it known that I, GEORGE L. CRAGG, a citizen of the United States, residing at Chicago, in the county of Cook and State of Illinois, have invented a certain new and useful Improvement in Electric-Railway Systems, (Case No. 10,) of which the following is a full, clear, concise, and exact description, reference being had to the accompanying drawings, forming a part of this specification.

My invention relates to electric-railway systems, and has for its object the provision of means whereby single-phase alternating current may be employed in effecting travel of electric-railway vehicles and whereby single-phase alternating-current supply-circuits may be extended along the line of travel to effect the operation of vehicles.

As is well known, the most effective form of motor for the purpose of transferring power and adapted for operation by single-phase alternating current is a motor which in itself is not capable of effectively operating a vehicle at varying rates of speed, which are required in actual practice when such motors have unchangeable-speed connection with the running-gear, being a motor such as a synchronous motor or a lag-motor having practically uniform rate of speed when most effective. In other words, the motor which is best adapted for the translation of power furnished by single-phase supply-circuits is a single-phase motor as distinguished from a split-phase motor. Polyphase motors would furnish the necessary power obviously, but such motors would need to be supplied by polyphase distribution-circuits.

In practicing my invention I interpose a variable gear or speed connection between the motor and the running-gear and provide in combination with such variable gear a motor means whereby the motor may be started, making thus a most effective combination, which will adapt single-phase motors for use as traction-motors.

In my present invention I so construct the single-phase motor that it may for the purpose of being started operate as a self-starting motor, such as a split-phase motor, being thereafter transformed into a single-phase motor when brought to the requisite speed, so that it may operate the vehicle. When the motor is provided with means that enable it to operate as a split-phase motor, I relieve it of operative connection with the vehicle running-gear, as when acting as a split-phase motor it would be incapable of starting if it had this load placed upon it. After the motor has been brought to the requisite speed it may then be coupled with the vehicle running-gear, preferably by means of some suitable clutching mechanism. Any suitable form of variable gear may be interposed between the single-phase motor and the running-gear of the vehicle.

I will explain my invention more fully by reference to the accompanying drawings, in which—

Figure 2:
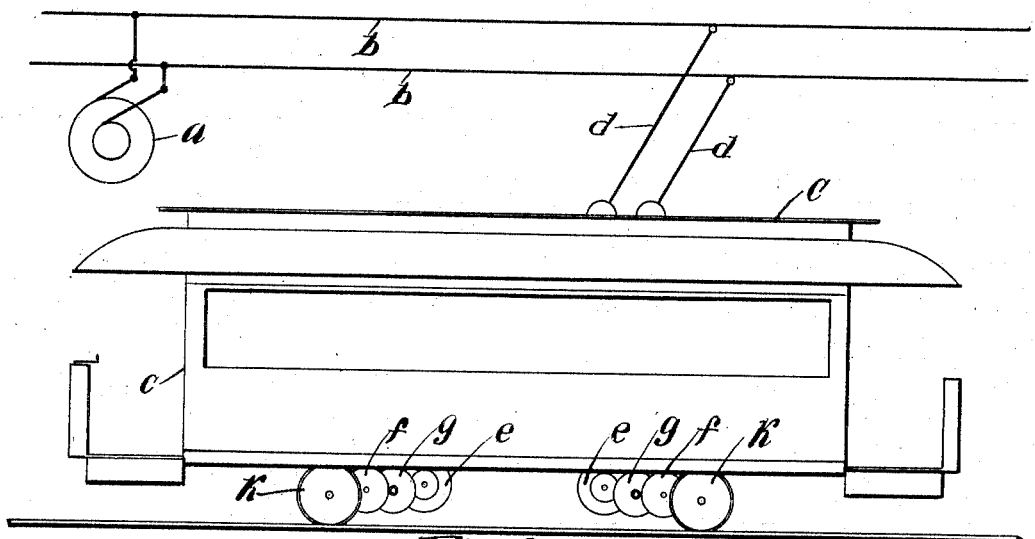

Figure 1 is a diagrammatic view of the operating mechanism upon a vehicle embodying my invention. Fig. 2 is a more general view, diagrammatically indicating a vehicle and elements of my invention in place thereupon.

Like parts are indicated by similar characters of reference in both views.

I have illustrated a source of single-phase alternating current $a$, connected with a supply-circuit whose mains $b\,b$ are illustrated in the form of trolley-wires extending along the line of travel. The car or other vehicle $c$ is provided with trolleys $d\,d$ or other suitable means of connection with the supply-circuit or equivalent means for receiving current in any manner from the supply-circuit. These trolleys or equivalent devices are connected in circuit with a single-phase motor $e$, provided upon the car, the motor in this particular instance being a lag-motor, though I do not wish to be limited to a motor of this kind.

The single-phase motor operates some suitable form of variable-speed gear, that illustrated comprising a pair of cones $f$ and $g$, gearing $h$ intervening between the cone $f$ and the shaft of the motor $e$, while gearing $i$ intervenes between the cone $g$ and the running-gear $k$ of the vehicle. The pinion upon the shaft or cone $g$ is loose thereon and has secured thereto one member of a clutch $l$, the other member being splined upon the said shaft, so that when the members of the clutch are out of engagement the cone $g$ may rotate without operating the gearing $i$; but when the clutch members are in engagement a rotation of the cone $g$ will cause an operation of the gearing $i$. When the members of the clutch are locked together, the speed of the gearing $i$, and consequently the running-gear of the vehicle, may vary with respect to the speed of the motor $e$ and cone $f$ by an adjustment of the belt $m$ toward or from the apex of a cone, which adjustment may be effected by a belt-shifter $n$. If the single-phase motor is to be started, the members of the clutch $l$ are separated, so as to relieve the motor of load, whereupon it may operate as a split-phase motor, the said motor being provided with a subsidiary circuit $o$, desirably containing a phase-modifier $p$, this subsidiary energizing-circuit being adapted by means of a switch $q$ to receive current supplied by the single-phase supply-circuit $b\ b$. The main working circuit of the motor and the subsidiary circuit when simultaneously closed cause a rotating field in the motor, temporarily transforming the same into a split-phase motor, which being relieved of the load of the vehicle is adapted to be brought to speed, whereafter the subsidiary circuit is opened, the members of the clutch locked, and the vehicle started.

I have not deemed it essential to illustrate the details of construction of the motor, as such construction will be apparent to any electrical engineer; nor do I wish to be limited to the mechanical features illustrated, as it is obvious that many changes may be made in the embodiment of the invention shown without departing from its spirit. I do not, therefore, wish to be limited to the precise construction illustrated; but,

Having thus described my invention, I claim as new and desire to secure by Letters Patent—

1. In an electric-railway system, the combination with a source of single-phase current, of a circuit supplied thereby extending along the line of travel, a vehicle, an alternating-current single-phase motor carried by the vehicle, a variable-speed gear constituting driving connection between the motor and the running-gear of the vehicle, means for separating this gear connection, and means for starting the motor, substantially as described.

2. In an electric-railway system, the combination with a source of single-phase current, of a circuit supplied thereby extending along the line of travel, a vehicle, an alternating-current single-phase motor carried by the vehicle, a variable-speed gear constituting driving connection between the motor and the running-gear of the vehicle, means for separating this gear connection, and means whereby the single-phase motor may be temporarily operated as a split-phase motor to start the motor, substantially as described.

3. In an electric-railway system, the combination with a source of single-phase current, of a circuit supplied thereby extending along the line of travel, a vehicle, an alternating-current single-phase motor carried by the vehicle, a variable-speed connection interposed between the motor and the running-gear of the vehicle, and means modifying the motor to a self-starter, substantially as described.

4. In an electric-railway system, the combination with a source of single-phase current, of a supply-circuit extending along the line of travel, a vehicle, an alternating-current single-phase motor carried by the vehicle, a variable-gear connection between the motor and the running-gear of the vehicle, and means whereby the motor may operate as a split-phase motor to permit the same to start, substantially as described.

5. In an electric-railway system, the combination with a source of single-phase current, of a supply-circuit extending along the line of travel, a vehicle, an alternating-current single-phase motor carried by the vehicle, a variable-speed connection between the motor and the running-gear of the vehicle, and means whereby the motor may operate as a split-phase motor to permit the same to start, substantially as described.

6. In an electric-railway system, the combination with a source of single-phase current, of a circuit supplied thereby extending along the line of travel, a vehicle, an alternating-current single-phase motor carried by the vehicle, a variable-gear connection interposed between the motor and the running-gear of the vehicle, means modifying the motor to a self-starter, and means whereby the variable-gear connection may be broken to relieve the motor of load in starting, substantially as described.

In witness whereof I hereunto subscribe my name this 7th day of May, A. D. 1902.

GEORGE L. CRAGG.

Witnesses:
FLORENCE WICKLIN,
JOHN STAHR.